(12) United States Patent
Devic et al.

(10) Patent No.: US 7,969,267 B2
(45) Date of Patent: Jun. 28, 2011

(54) REINFORCED FLUOROPOLYMER PLATES, PRODUCTION METHODS THEREOF, CORROSION-RESISTANT REACTORS CONTAINING SAID PLATES, PRODUCTION METHODS OF SAME AND FLUORINATION METHODS PERFORMED IN SAID REACTORS

(75) Inventors: Michel Devic, Sainte-Foy les-Lyon (FR); Phillipe Bonnet, Lyone (FR); Eric Lacroix, Amerieux d'Azergues (FR); Sylvain Perdrieux, Charly (FR)

(73) Assignee: Arkema, Puteaux (FR)

( * ) Notice: Subject to any disclaimer, the term of this patent is extended or adjusted under 35 U.S.C. 154(b) by 1021 days.

(21) Appl. No.: 10/584,675

(22) PCT Filed: Dec. 9, 2004

(86) PCT No.: PCT/FR2004/003169
§ 371 (c)(1),
(2), (4) Date: Apr. 24, 2007

(87) PCT Pub. No.: WO2005/073292
PCT Pub. Date: Aug. 11, 2005

(65) Prior Publication Data
US 2007/0275225 A1   Nov. 29, 2007

(51) Int. Cl.
*H01F 27/02* (2006.01)
(52) U.S. Cl. .......................................................... 336/90
(58) Field of Classification Search .................... 336/65, 336/83, 90, 92, 196, 198, 205–208, 233–234
See application file for complete search history.

(56) References Cited

U.S. PATENT DOCUMENTS

| | | | |
|---|---|---|---|
| 3,779,854 A | 12/1973 | Dukert et al. | |
| 3,824,115 A | 7/1974 | Segawa et al. | |
| 3,962,373 A | 6/1976 | Petrucelli | |
| 4,161,689 A * | 7/1979 | Schlosberg et al. | 324/557 |
| 4,166,536 A | 9/1979 | Roberts et al. | |
| 4,504,528 A | 3/1985 | Zucker et al. | |

FOREIGN PATENT DOCUMENTS

| | | |
|---|---|---|
| WO | 99/00344 | 1/1999 |
| WO | 99/52971 | 10/1999 |

OTHER PUBLICATIONS

International Search Report for PCT/FR2004/003169 filed Dec. 12, 2004.
Derwent Publications Ltd., (1978-20340A) XP002283109.
Patent Abstract of Japan (No. JP 60064814).

* cited by examiner

*Primary Examiner* — Tuyen Nguyen
(74) *Attorney, Agent, or Firm* — Husch Blackwell LLP

(57) ABSTRACT

The invention relates to a reinforced fluoropolymer plate comprising a fluoropolymer layer on one of the faces thereof and a carbon fiber sheet on the other face of same, whereby at least part of the carbon fiber sheet is impregnated with fluoropolymer. The invention also relates to an acid-corrosion-resistant chemical reactor comprising said plates, the production methods thereof and the uses of same in processes in superacid media.

16 Claims, 1 Drawing Sheet

REINFORCED FLUOROPOLYMER PLATES, PRODUCTION METHODS THEREOF, CORROSION-RESISTANT REACTORS CONTAINING SAID PLATES, PRODUCTION METHODS OF SAME AND FLUORINATION METHODS PERFORMED IN SAID REACTORS

FIELD OF THE INVENTION

The present invention relates to fluoropolymer plates reinforced on one of their faces with carbon fibers, to a chemical reactor resistant to acid corrosion comprising said plates, to production methods of same, and to uses thereof in methods performed in a superacidic medium.

PRIOR ART AND TECHNICAL PROBLEM

Reactions in a superacidic medium, in particular fluorination reactions in the liquid phase, require, in order to be effective, the use of a reaction mixture rich in HF and $SbCl_5$ (or $SbCl_xF_y$) and high temperatures (80 to 120° C.). Anhydrous HF in the liquid phase forms a very corrosive superacidic medium with $SbCl_5$. The usual corrosion-resistant metals and alloys such as stainless steels, inconels, nickel, hastelloy etc. do not have sufficient resistance for making an industrial reactor.

One solution (JP 07-233102) consists of applying a fluoropolymer lining to the inside of a stainless steel reactor. Another solution (U.S. Pat. No. 4,166,536 and U.S. Pat. No. 3,824,115) consists in using a fluoropolymer containing particles of inorganic substances such a silica, graphite or carbon.

However, application of this type of lining to the inside of the reactor gives rise to many technical problems as emphasized in patent WO 99/00344:
- deposits of polymers obtained by spraying and melting polymer powders are porous, the metal is attacked by HF and the lining becomes detached,
- deposits obtained by melting and rotational moulding are thicker and more impervious, but this technique is limited to small reactors (<3785 liters) and, moreover, these linings, even thick ones, are still slightly permeable and acids eventually penetrate between the polymer layer and the metal wall of the reactor and excess pressures are created producing considerable swelling and deformation of the fluoropolymer lining.

Patent WO 99/00344 proposes to remove these excess pressures by drilling small holes in the wall of the reactor (0.31 cm to 1.27 cm diameter).

The use of a fluoropolymer lining in an industrial reactor is moreover only possible at the present time at a low temperature (20 to 40° C.) since the coefficient of expansion of fluoropolymers is very much greater than that of steel. At temperatures necessary for the fluorination in the liquid phase of chloroalkanes (80 to 120° C.), expansion of the liner is very considerable and brings about structural disruption (folds, tension, deformation, tears, stripping) aggravated by the low mechanical strength of the polymer when hot.

In addition, problems are known of the differential expansion between the polymer and metal in reactors which brings about detachment and stripping of the lining. Solutions using multilayer linings of fluoropolymers and resin (U.S. Pat. No. 3,779,854) and glass fibers exist but are totally unsuitable for use with reactions in a superacidic medium such as HF.

Thus, up to now, no satisfactory solution has been found for the construction of reactors that are resistant both chemically and mechanically to superacidic corrosive media.

SUMMARY OF THE INVENTION

The object of the invention is to provide fluoropolymer plates reinforced on one of their faces with carbon fibers and a novel type of reactor comprising these plates that is resistant both mechanically and chemically to acidic corrosive media.

These plates can constitute a floating inner lining in the reactor, or indeed form an integral part of the wall of the reactor.

The invention thus relates to:

1. As shown in FIG. 1, a reinforced fluoropolymer plate 10 comprising a layer 14 of fluoropolymer on one of its faces, and a sheet 12 of carbon fibers on the other face, at least part of the sheet of carbon fibers being impregnated with fluoropolymer, as seen in layer 13.

2. The plate according to point 1, in which the polymer-impregnated thickness $t_2$ represents at least 10% of the thickness $t_1$ of the sheet of carbon fibers, preferably 10% to 90%, advantageously 30 to 70%.

3. The plate according to point 1 or 2, in which the fluoropolymer is chosen from the group consisting of polychlorotrifluoroethylene (PCTFE), polyvinylidene fluoride (PVDF), copolymers of tetrafluoroethylene and perfluoropropene (FEP), copolymers of tetrafluoroethylene and perfluoro-propylvinylether (PFA), copolymers of tetrafluoroethylene and ethylene (ETFE), polymers of trifluorochloroethylene and ethylene (E-CTFE) and blends thereof.

4. The plate according to one of points 1 to 3, in which the fluoropolymer is the copolymer of tetrafluoroethylene and hexafluoropropylene (FEP).

5. The plate according to one of points 1 to 4, of which the total thickness t lies between 1 and 20 mm, preferably 2 to 5 mm.

6. The plate according to one of points 1 to 5, in which the sheet of carbon fibers is in the form of a woven or nonwoven sheet, preferably in the form of a sheet of crossed carbon fibers.

7. The plate according to one of points 1 to 6, in which the sheet of carbon fibers has a thickness of between 0.1 and 10 mm, preferably 0.5 to 3 mm.

8. The plate according to one of points 1 to 7 comprising:
a layer of fluoropolymer on one of the faces of the plate,
a layer of carbon fibers free from fluoropolymer on the other face of the plate, and
a central layer consisting of carbon fibers impregnated with fluoropolymer.

9. The use of the plate according to one of points 1 to 8 for the production of floating linings for reactors, tanks and pipework intended to be in contact with acidic and/or superacidic corrosive media.

10. A floating lining comprising a plurality of plates according to one of points 1 to 8, said plates being butt-welded together.

11. A reactor comprising:
an inner metal wall, and
a floating lining according to point 10, situated on all or part of the inner wall of the reactor, the face of the lining comprising carbon fibers free from fluoropolymer being positioned against the inner metal wall of the reactor.

12. The reactor according to point 11, additionally comprising:
a plurality of orifices in the inner wall, connected to a network of pipes;
a pressure-regulating device connected to the network of pipes maintaining the pressure inside the space between the fluoropolymer layer and the lower inner wall at the pressure existing inside the reactor.

13. A reactor comprising an inner wall, comprising one or more plates according to one of points 1 to 8, reinforced with a layer made of composite material and carbon fibers.

14. The reactor according to point 13 comprising, around the inner wall, an additional, noncontiguous outer metal jacket.

15. A method for producing the plates according to one of points 1 to 8 comprising:
   bringing the sheet of carbon fibers into contact with the fluoropolymer;
   melting one face of the fluoropolymer plate; and
   pressing the polymer until cool.

16. The production method according to point 15, wherein: one face of the fluoropolymer plate is brought into contact and melted by extruding said fluoropolymer onto the sheet of fibers.

17. A method for producing a floating lining according to point 10, comprising:
   providing at least one plate according to one of points 1 to 8;
   cutting out and forming this plate inside a metal reactor, the face covered with carbon fiber fabric being in contact with the metal wall of the reactor;
   where appropriate, butt-welding the cut-outs of said at least one plate.

18. A method for producing a reactor according to point 13, comprising:
   providing at least one plate according to one of points 1 to 8;
   cutting out and forming this plate on a former, the face made of fluoropolymer being in contact with the former;
   where appropriate, butt-welding the cut-outs of said at least one plate;
   applying at least one layer of composite material and a sheet of carbon fibers to said free face and then polymerizing the composite material.

19. A fluorination method in the liquid phase, in which said reaction is performed in a reactor according to one of points 11 to 14.

20. The fluorination method according to point 20, in which the temperature lies between 60 and 150° C.

BRIEF DESCRIPTION OF THE DRAWINGS

The following drawing is included for illustrative purposes and is not drawn to scale.

DETAILED DESCRIPTION OF THE INVENTION

Figure 1:
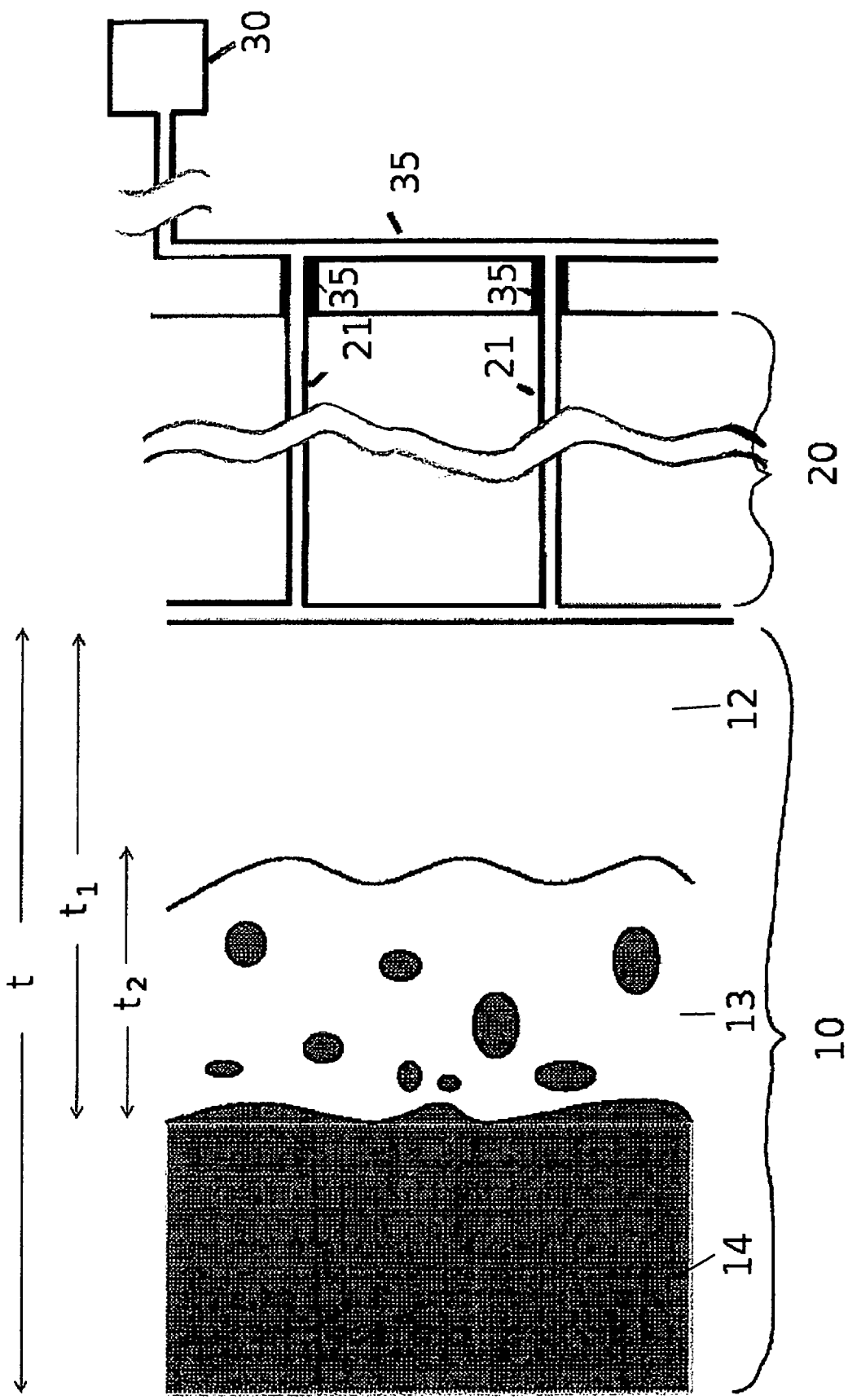
FIG. 1 is a partial cross-sectional view of a liner positioned against an inner wall of a reactor, in combination with a block diagram representation of a network of pipes and a pressure regulating device, in accordance with an embodiment of the invention.

The thickness of the final reinforced fluoropolymer plate may be 1 to 20 mm and preferably 2 to 5 mm.

The fluoropolymers (FP) used in the invention are thermoplastic polymers that are resistant to acidic media, chosen in particular from the group consisting of polychlorotrifluoroethylene (PCTFE), polyvinylidene fluoride (PVDF), copolymers of tetrafluoroethylene and perfluoropropene (FEP), copolymers of tetrafluoroethylene and perfluoro-propylvinylether (PFA), copolymers of tetrafluoroethylene and ethylene (ETFE), polymers of trifluorochloroethylene and ethylene (E-CTFE) and mixtures thereof.

Preferably, the fluoropolymer used is the copolymer of tetrafluoroethylene and hexafluoropropylene (FEP) for its properties of not allowing antimony (Sb) to diffuse into the polymer. The FEP used has 10 to 15% and preferably 12% by weight of hexafluoropropylene.

The FP layer ensures the chemical resistance of the plate once formed and enables the metal of the reactor to be protected from corrosion by virtue of its imperviousness through its barrier action.

The carbon fibers are used in the form of sheets of fibers (or fabric), that are in particular woven or nonwoven, identical to those normally used in the carbon fiber composite materials industry (automotive, ski, boats).

The carbon fibers used are in woven form or in the form of windings according to conventional production techniques for producing carbon fiber composites.

Sheets of crossed carbon fibers are preferably used.

The thickness of the sheet of carbon fibers may lie between 0.1 and 10 mm, preferably 0.5 and 3 mm. The chosen thickness depends on the ultimate type of application for the reinforced plate.

The sheet of carbon fibers increases the mechanical strength of the FP layer and in particular its hot creep resistance.

It enables the composite material to be subsequently attached to the layer of carbon fibers free from FP, particularly in the case of a reactor of composite construction as described further on.

The method for producing reinforced plates may comprise bringing carbon fibers into contact with the fluoropolymer; melting one face of the fluoropolymer plate; applying carbon fibers to the molten polymer face; and pressing until the polymer is cool.

The sheet of carbon fibers is bonded to one face of the FP plate by melting the FP in contact with the sheet and by penetration of the molten FP through at least part of the thickness of the sheet.

According to a preferred embodiment, the reinforced fluoropolymer comprises:
   a layer of fluoropolymer on one face of the plate;
   a layer of carbon fibers free of fluoropolymer on the other face of the plate;
   a central layer consisting of carbon fibers impregnated with fluoropolymer.

Processing may be carried out by heating one face of the FP plate until a surface FP layer is melted followed by application of the sheet and pressing under high pressure until the FP is cool.

Techniques for coextruding FP and the sheet may also advantageously be employed during the production of the FP plate.

Impregnation of the sheet of carbon fibers by molten FP may be carried out at least partially.

The impregnation thickness (degree of impregnation) is at least 10%, preferably 10 to 90% of the thickness of the carbon fiber sheet or fabric and advantageously 30 to 70%.

On account of partial impregnation, the non-impregnated part of the sheet of carbon fibers may, by virtue of its porosity, act as a free space (for gases) between the inner metal wall of the reactor and the impervious FP layer, in particular in the case of a reactor covered with a liner as described further on.

Thus, the degree of impregnation as defined above is sufficient to ensure that the sheet is firmly attached to the FP, so as to ensure the mechanical reinforcement of the FP plate, of which the mechanical properties when hot are too low, and finally to ensure the dimensional stability of the FP plate as the polymer expands under the action of temperature.

Once formed, the reinforced plates can serve in the production of a floating lining (called a liner) of the reactor.

This liner is made with one or more FP plates reinforced with carbon fibers on one face. When the liner is made with several plates, these are butt-welded.

Using FEP, a particularly impervious lining is obtained acting as an obstacle in particular to the diffusion of antimony. FEP also has the advantage of being easy to weld at low temperature.

In the liner according to the invention, the sheet of carbon fibers is very firmly bonded to the FP plate (extrusion of FP through one face of the sheet of carbon fibers). This reinforcement made of carbon fibers ensures the dimensional stability of the FP plate forming the liner, expansion of the FP only occurring on the thickness of the plate. Creep is avoided in this way as well as the formation of folds when the reaction mixture is heated in the reactor.

The liner (or floating lining) is applied to the inside of the reactor or only on the part of the reactor in contact with the corrosive medium (liquid phase), and advantageously the liner is only applied to the vessel of the reactor.

The porous layer made of carbon fibers on the outer face of the FP plate creates a space that is permeable to gases. This porous layer improves the distribution of pressure between the metal wall of the reactor and the liner and in this way prevents the formation of gas pockets resulting from the diffusion of reactants through the fluoropolymer barrier layer.

This space makes it possible to collect gaseous HF which may diffuse very slightly through the FP under the action of high pressures from the fluorination reaction (10 to 15 bar).

This space created by the porous layer also makes it possible for the gas to circulate to the orifices 21 drilled in the metal wall 20 of the reactor, when such orifices are present.

As seen in FIG. 1 these, orifices 21 are connected to a network of pipes 35 for regulating, where necessary, the pressure existing in this space and for always maintaining it less than that existing in the reactor. The liner is thus always held strongly pressed against the wall of the reactor under the effect of pressure without the use of adhesives which do not withstand the diffusion of HF. It is moreover easier to dismantle.

To this end, the reactor may include a device 30 for maintaining the pressure lower than the pressure of the reactor in the space included between the inner metal wall of the reactor and the outer wall of the FP of the liner reinforced with carbon fibers.

The pipes terminate in a tank of which the pressure is maintained at a value that is always below that of the reactor by means of a vacuum pump (atmospheric pressure reactor) or else by injecting an inert gas. This pressure difference may be from 0.1 to 15 bar and preferably 0.5 to 2 bar.

The diameter of the orifices may be 1 to 20 mm and a mesh may be placed on the side of the orifice in contact with the liner. The diameter of this mesh is advantageously greater than that of the orifice.

The number of orifices drilled in the wall of the reactor depends on the diameter of these orifices and on the thickness of the sheet of carbon fibers that is not impregnated with FP. It may be from 1 to 20 per $m^2$ of wall and preferably 2 to 5 per $m^2$.

The presence of this porous layer also makes it possible to reduce the number of holes necessary for evacuating gases without reducing the effectiveness with which the liner is attached to the metal wall of the reactor under the action of the internal pressure of the reactor.

Reactors covered with a liner such as described above are capable of withstanding reaction conditions in a superacidic medium, in particular fluorination reactions in the liquid phase, such as temperatures ranging from 0 to 150° C. and preferably 60 to 120° C., and a pressure of 1 to 15 bar absolute.

According to another feature, the invention relates to a reactor (called a composite reactor) of which the wall has an inner layer of fluoropolymer, a central layer consisting of carbon fibers impregnated with fluoropolymer and a layer of carbon fibers free from fluoropolymer and impregnated with composite material (called a composite layer made of carbon fibers).

The composite material used is preferably a resin chosen from resins that are compatible with (super) acidic media, and in particular HF. Use may be made in particular of phenylene sulfide (PPS) and polyetheretherketone (PEEK).

The carbon fibers are in the form of sheets or fabrics or yarn.

This composite layer made of carbon fibers ensures in particular the mechanical strength of the reactor, tank or pipework elements.

Its thickness is calculated according to the stresses, in particular the pressure under, which the reactor is used. Its thickness may extend from a few millimeters to several centimeters.

In this embodiment, the bonding of the actual layers are as follows:

the composite layer is bonded to the sheet of carbon fibers (central layer) by resin in the region of the face of the sheet free from FP;

the central layer of the sheet of carbon fibers is bonded to the FP layer by melting the FP in contact with this sheet and by penetration of the molten FP through part of the sheet of carbon fibers.

The coating of the sheet of carbon fibers with FP is only partial so that the surface of the sheet of carbon fibers in contact with the composite layer is not covered with FP and so that the composite can be bonded onto the sheet by resin.

These composite reactors can be produced according to the method in which:

in a first step, FP plates are produced reinforced by a sheet of carbon fibers with one face of the sheet free from FP;

the central layer of the sheet of carbon fibers is bonded to the FP layer by melting the FP in contact with this sheet and by penetration of the molten FP through part of the sheet of carbon fibers. The thickness of this FP plate is preferably 2 to 5 mm and that of the sheet of carbon fibers 0.5 to 3 mm;

as previously, the sheet of carbon fibers is attached to the FP at the moment the plate is extruded and the sheet is covered by molten FP over part of its thickness;

in a second step, one or more of these plates are then cut up and applied to a former having the internal dimensions of the reactor, with the FP face against the former and then, as the case may be, butt-welded together by a hot gas jet;

in a third step, the layer of composite is then put into place by successively applying composite material and carbon fibers around the former covered with reinforced FP plates;

then, after drying and curing, the inner former is taken away so as to disengage the inner wall of the composite reactor.

The composite reactor according to the invention makes it possible to limit, or even eliminate, the problems of differential expansion between the polymer and the metal, in this way preventing the lining from being detached and pulled off.

According to a particular embodiment, when reactors, tanks or pipework are used under high pressures, an additional metal jacket, for example one made of steel, may be added around the composite reactor.

This jacket is not contiguous, a space of several centimeters being provided so as to enable the composite reactor to expand. The steel jacket is dimensioned so as to withstand the pressure of the reactor in the case of leakage or of a breakage of the composite reactor.

A device for detecting leakage may be added so as to detect the presence of chemical in the free space between the composite reactor and the metal chamber.

When FEP is used as the fluoropolymer in the production of reinforced plates, its main drawbacks, that is to say softening and excessive expansion when hot, are overcome.

Thus, the use of FEP makes it possible to produce a lining for the reactor (or for the tank or indeed for the pipework) that is effective particularly for performing the fluorination of chloroalkanes in the liquid phase, under pressure and hot.

Reactors produced in this way with reinforced plates according to the invention are capable of withstanding reaction conditions in a superacidic medium, in particular fluorination reactions in the liquid phase, such as temperatures ranging from 0 to 150° C. and preferably 60 to 120° C. and a pressure of 1 to 15 bar absolute.

The plates according to the invention can be used for the production of floating linings (liners) of metal reactors or indeed for producing reactors, tanks or pipework made of composite material used for the reaction, storage or transport of corrosive acidic products, in particular mixtures of hydrofluoric acid and antimony halide.

The conditions under which the reactors, tanks or pipework are used comprise temperatures from 0 to 150° C. and pressures of 0 to 15 bar.

EXAMPLES

The following examples illustrate the present invention without limiting it.

Example 1

Preparation of Reinforced Fluoropolymer Plates

FEP plates were produced covered on one face with a carbon fiber fabric (sheet of woven carbon fibers).

The thickness of the FEP plate was 3 mm and that of the carbon fabric 1 mm.

The carbon fabric was attached to the FEP plate at the moment the FEP was extruded and the fabric was covered by molten FEP over approximately half its thickness.

The total thickness of the plate was 3.3 mm.

Example 2

Preparation of a Floating Lining (Liner)

The plates prepared in example 1, approximately 3 m² in size, were cut up and applied to the inside of the chamber of the reactor, the face covered with the carbon fiber fabric being against the metal wall. The cut plates were butt-welded together by a hot gas jet so as to form a continuous impervious lining over all the inner surface of the chamber of the reactor, including that part of the chamber in contact with the seal of the reactor lid.

The plates were cut out so that the welds of the plates were preferably situated on surfaces with a large radius of curvature.

Example 3

Preparation of the Composite Reactor

The plates prepared in example 1, approximately 3 m² in size, were cut up and applied to a former having the internal dimensions of the reactor, with the FEP face against the former, and then butt-welded together by a hot gas jet.

The composite layer was then put in place by successive applications of resin and carbon fiber fabric around the former.

After drying and polymerization, the inner former was removed.

Example 4

Resistance Tests in a Superacidic Medium of a Plate Prepared According to Example 1

An FEP sample plate covered with carbon fiber fabric, 2 cm×2 cm×3.3 mm in size, was placed for 400 h in a reactor used for fluorination reactions in the liquid phase under the following conditions:

Temperature: 80 to 110° C.

Pressure: 10 to 13 bar

Fluorination medium: a mixture of anhydrous HF and $SbCl_5$

Reactants subjected to fluorination: trichloroethylene, dichloromethane and trichloroethane.

Following these tests, no deterioration was observed in the sample, nor any detachment of the layer of carbon fibers, nor any loss of weight.

The invention claimed is:

1. A reactor comprising:
   an inner metal wall, and
   a floating lining comprising a plurality of reinforced fluoropolymer plates said plates comprising a layer of fluoropolymer on one of its faces, and a sheet of carbon fibers on the other face, at least part of the sheet of carbon fibers being impregnated with fluoropolymer, said plates being butt-welded together, said floating lining being situated on all or part of the inner wall of the reactor, the face of the lining comprising carbon fibers free from fluoropolymer being positioned against the inner metal wall of the reactor.

2. The reactor as claimed in claim 1, additionally comprising:
   a plurality of orifices in the inner wall, connected to a network of pipes;
   a pressure-regulating device connected to the network of pipes maintaining the pressure inside the space between the fluoropolymer layer and the lower inner wall at the pressure existing inside the reactor.

3. The reactor as claimed in claim 1, in which the polymer-impregnated thickness of the plates represents at least 10% of the thickness of the sheet of carbon fibers.

4. The reactor as claimed in claim 3, in which the polymer-impregnated thickness of the plates represents 10% to 90% of the thickness of the sheet of carbon fibers.

5. The reactor as claimed in claim 1, in which the fluoropolymer is chosen from the group consisting of polychlorotrifluoroethylene (PCTFE), polyvinylidene fluoride (PVDF), copolymers of tetrafluoroethylene and perfluoropropene (FEP), copolymers of tetrafluoroethylene and perfluoro-propylvinylether (PFA), copolymers of tetrafluoroethylene and ethylene (ETFE), polymers of trifluorochloroethylene and ethylene (E-CTFE) and blends thereof.

6. The reactor as claimed in claim 1, in which the fluoropolymer is the copolymer of tetrafluoroethylene and hexafluoropropylene (FEP).

7. The reactor as claimed in claim 1, in which the total thickness having said plates lies between 1 and 20 mm.

8. The reactor as claimed in claim 7, in which the total thickness of the plates lies between 2 and 5 mm.

9. The reactor as claimed in claim 1, in which the sheet of carbon fibers is in the form of a woven or nonwoven sheet.

10. The reactor as claimed in claim 1, in which the sheet of carbon fibers is in the form of a sheet of crossed carbon fibers.

11. The reactor as claimed in claim 1, in which the sheet of carbon fibers has a thickness of between 0.1 and 10 mm.

12. The reactor as claimed in claim 11, in which the sheet of carbon fibers has a thickness of between 0.5 and 3 mm.

13. The reactor as claimed in claim 1 wherein said plates comprising:
    a layer of fluoropolymer on one of the faces of the plate,
    a layer of carbon fibers free from fluoropolymer on the other face of the plate, and
    a central layer consisting of carbon fibers impregnated with fluoropolymer.

14. A method for producing a reactor as claimed in claim 1, provided with a floating lining, comprising:
    providing at least one reinforced fluoropolymer plate comprising a layer of fluoropolymer on one of its faces, and a sheet of carbon fibers on the other face, at least part of the sheet of carbon fibers being impregnated with fluoropolymer;
    cutting out and forming this plate inside a metal reactor, the face covered with carbon fiber fabric being in contact with the metal wall of the reactor;
    where appropriate, butt-welding the cut-outs of said at least one plate.

15. A fluorination method in the liquid phase, in which said reaction is performed in a reactor as claimed in claim 1.

16. The fluorination method as claimed in claim 15, in which the temperature lies between 60 and 150° C.

* * * * *